United States Patent [19]

Langhammer

[11] Patent Number: 5,544,569
[45] Date of Patent: Aug. 13, 1996

[54] GRIDDLE AND HEATER BAG

[76] Inventor: Jerome Langhammer, 1407 Royal York Rd. Suite 307, Weston, Ontario, Canada, M9P 3A6

[21] Appl. No.: 287,806

[22] Filed: Aug. 9, 1994

Related U.S. Application Data

[63] Continuation-in-part of Ser. No. 271,494, Jul. 7, 1994, abandoned, which is a continuation of Ser. No. 64,206, May 21, 1993, abandoned.

[51] Int. Cl.[6] .......................... A47J 37/10; B65D 30/22
[52] U.S. Cl. ...................... 99/422; 99/423; 99/390; 99/393; 383/40; 383/116
[58] Field of Search ........................ 99/422, 423, 349, 99/386, 387, 425, 450, 393; 383/38, 40, 103, 113, 116; 229/87.08, 938

[56] References Cited

U.S. PATENT DOCUMENTS

| | | | |
|---|---|---|---|
| 3,064,554 | 11/1962 | Lamb | 99/425 |
| 3,307,475 | 3/1967 | Munsey | 99/429 |
| 3,520,249 | 7/1970 | Miller, Jr. | 99/386 |
| 3,646,879 | 3/1972 | Palmason et al. | 99/339 |
| 3,693,452 | 9/1972 | McGinley et al. | 99/386 |
| 3,739,712 | 6/1973 | Duning | 99/349 |
| 3,979,051 | 9/1976 | Close | 383/40 X |
| 3,980,225 | 9/1976 | Kan | 383/116 X |
| 4,261,257 | 4/1981 | Henderson et al. | 99/386 |
| 4,488,480 | 12/1984 | Miller et al. | 99/386 |
| 4,515,840 | 5/1985 | Gatward | 229/87.08 |
| 4,530,276 | 7/1985 | Miller | 99/386 |
| 4,550,653 | 11/1985 | Hedenberg | 99/348 |
| 4,550,654 | 11/1985 | Hedenberg | 99/348 |
| 4,648,860 | 3/1987 | Cassey | 383/40 X |
| 5,146,840 | 9/1992 | Hedenberg | 99/348 |
| 5,335,996 | 8/1994 | Cortopassi et al. | 383/116 X |
| 5,380,093 | 1/1995 | Goldman | 383/100 X |

FOREIGN PATENT DOCUMENTS

| | | | |
|---|---|---|---|
| 1086644 | 11/1953 | France | 99/421 H |
| 926657 | 5/1963 | United Kingdom | 383/40 |

*Primary Examiner*—Timothy F. Simone
*Assistant Examiner*—Patrick F. Brinson

[57] ABSTRACT

Adjustably spaced vertical heating panels have heated facing surfaces which with end walls and a sliding bottom panel define a vertical heating space wherein chips or other foodstuffs can be cooked.

12 Claims, 8 Drawing Sheets

GRIDDLE AND HEATER BAG

This is a Continuation-in-Part of application Ser. No. 08/271,494 filed Jul. 7, 1994 now abandoned, which is a Continuation of application Ser. No. 08/064,206 filed May 21, 1993 also abandoned.

This invention relates to means and a method for heating foodstuffs and is thought to be of principal value for heating of potato chips.

It is well known that it is desirable to heat potato chips on opposed sides in a single layer rather than on one side only. However, prior methods have provided a pair of horizontal panels to heat the single layer of chips. However, using horizontal panels, grease tends to collect on the lower panel and on its support providing a major cleaning problem. Moreover, placing chips on a horizontal panel in a single layer is difficult and time consuming.

This invention in one aspect, provides means and a method for heating chips in a heating space between the facing surfaces of a pair of vertical heating panels. The facing surfaces of the heating panels are made relatively smooth. The spacing between the panels is adjustable. Thus when it is decided to cook a certain type of chip, the spacing of the panels is adjusted to be at least slightly greater than the average chip dimension but less than double that dimension. End walls are provided for the heating space and a bottom wall for the heating space is provided, moveable between CLOSED and OPEN position. Thus, with the bottom wall in closed position, the width of the heating space may be adjusted as above defined and chips are poured into the heating space from the top. Since the width of the space is less than double the chip cross section, the chips tend to assume a single layer. When the chips are cooked the bottom panel may be moved to OPEN position to allow the chips to fall into a receptacle. Because the panels are vertical, the grease tends to run off through the apparatus to whatever receptacle is placed below. There is thus no grease build-up and the apparatus is easy to clean. Where the panels as is preferred provide smooth surfaces facing the chips, the chips are easy to remove and the panels are particularly easy to clean and since their spacing is adjustable, may easily be separated for this purpose. Since the spacing is adjustable, the spacing may be easily and conveniently adjusted for different sizes of chips.

Although the device is particularly useful for the heating of chips, it is useful for heating other particulate food, or for sandwiches, waffles, meat patties and other foodstuffs suitable for heating in the adjustable width vertical space.

In another aspect of the invention a heating space as generally described above is combined with a pair of screens (preferably of stainless steel) formed by a hinge movable between open and closed position, designed to be lined with non-combustible paper creased adjacent to the hinge, designed to receive hamburg patties between the layers of said paper, where the screens are dimensioned and sloped, so that in closed position with hamburg patties between them, said screens may be received in said heating space. Such pair of screens is ideal for cooking a number of meat patties at once.

By 'non combustible paper' herein I mean a sheet of parchment coated on each side with silicone, so that coated sheet will maintain its integrity under exposure to cooking heats.

By parchment here I include paper.

As stated above the hinged screen arrangement is ideal for cooking a group of meat patties but not as versatile when single orders are cooked. Once the hinged screens are loaded while only partially filled, the cooking cycle cannot be interrupted and more patties added. During the duration of the cooking cycle the operater has to wait 2½ to 4 minutes before more patties can be cooked.

Also use of the hinged screens is often found by the kitchen help to be more labour intensive.

Another aspect of the invention eliminates the problems of the hinged screens. This aspect of the invention provides a parchment sheet coated on each side with silicone folded to provide bag side walls. The facing edges of the side walls are glued together with silicone adhesive to form an upwardly open bag which will receive food such as hamburg patties and retain its integrity at cooking temperature. The opposed side walls are glued together at one or more small areas a short distance above the bottom of the bag. Such areas are arranged to prevent hamburg patties going below but to allow the grease from the cooking patties to flow into the space below the areas, thus creating a separate holding area for the released fats from the meat patties during the cooking. Since some meat patties contain up to 30% of animal fats this becomes a desirable feature of this invention.

The bag is designed for reception in the heating space between the heating panels and above the bottom wall. With a bag that can hold one or two patties, there is a space in the heating space to add another bag at any time. After the completion of the cooking time for each bag, it may be removed, the cooked patties removed and the excess fats drained from the container. The containers are found to be re-usable for about 6 or 7 cooking cycles before they lose their integrity.

While using this type of cooking container the heating panels remain totally dry, clean and smoke free and require virtually no cleaning. The presence of a glued area to keep the patties clear of the bag bottom prevents the patties cooking in fat and becoming greasy and saturated.

A bag can be similarly constructed for other foodstuffs. The glued area or areas to maintain such other foodstuffs clear of the bottom during cooking will be arranged to suit the contours of the foodstuffs.

Where the food to be cooked is relatively free of grease, (for example a sandwich) the co-adhering areas a short distance above the bottom of the bag may be omitted.

The bag, as above described, is independently inventive and may be used to advantage in other cooking environments than inventive heating space.

In drawings which illustrate a preferred embodiment of the invention:

Figure 1:
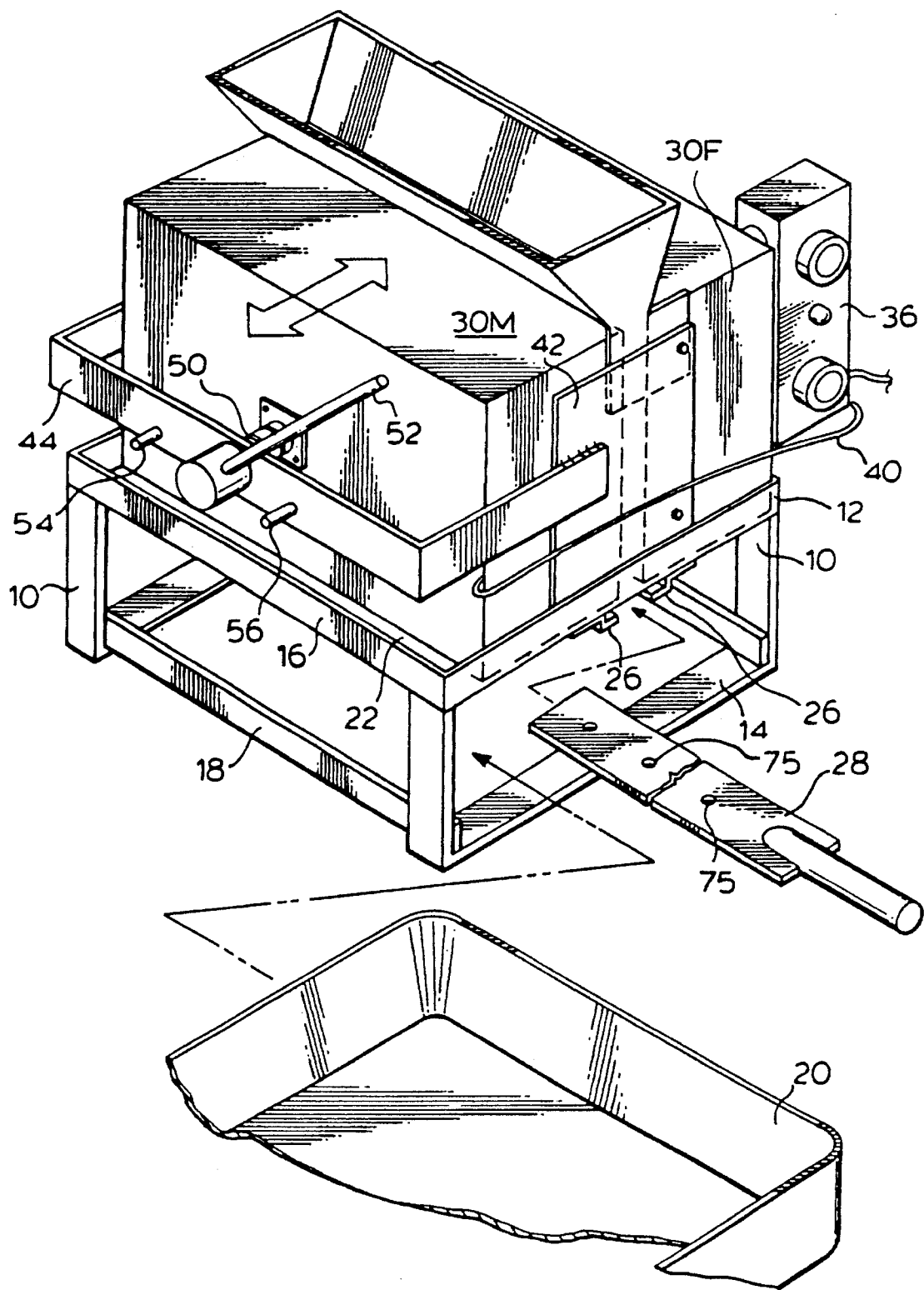
FIG. 1 is a perspective, partially exploded view of a device in accord with the invention.
Figure 2:
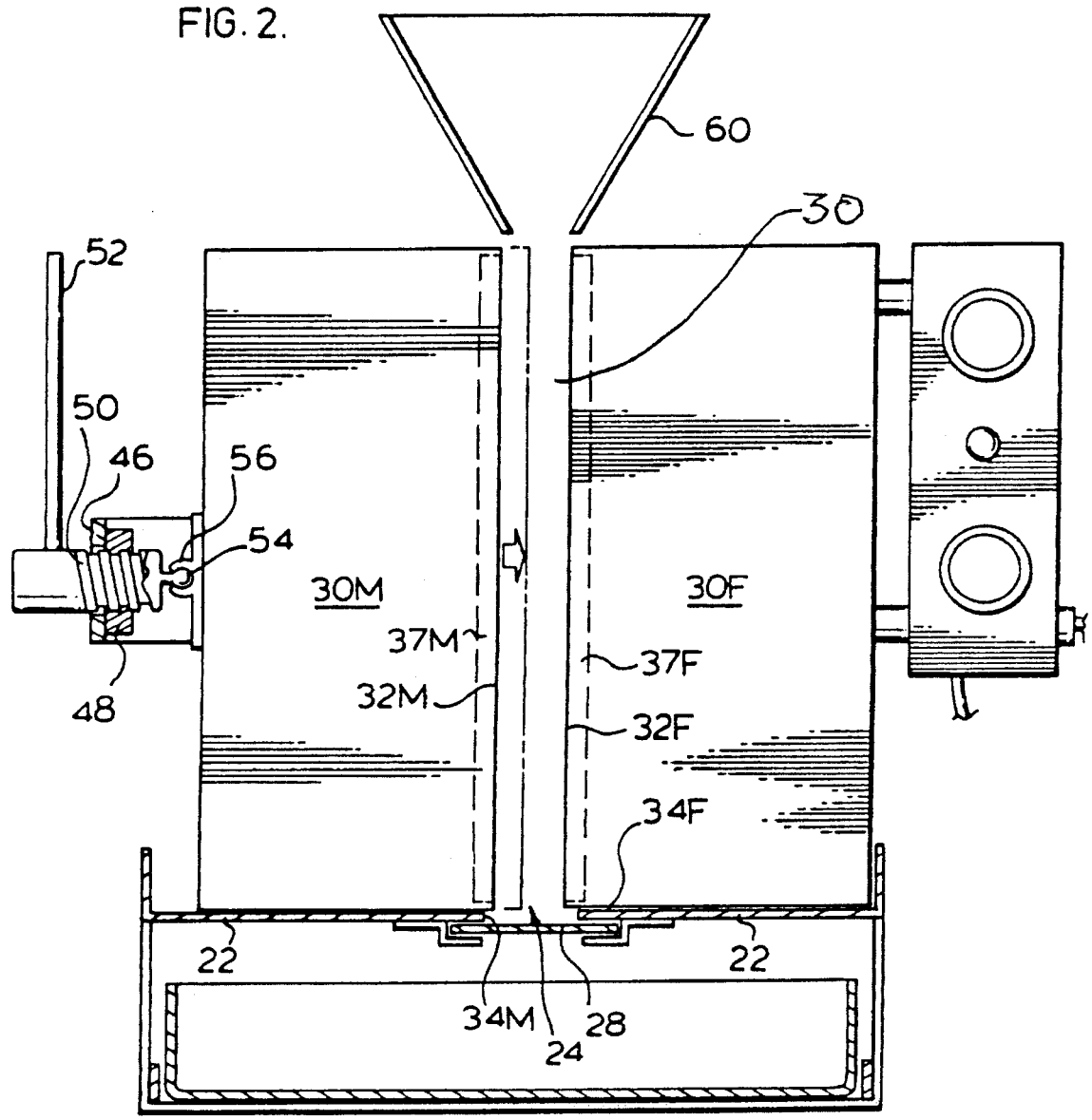
FIG. 2 is a vertical section through the device taken parallel to the direction of relative movement between the panels.
Figure 3:
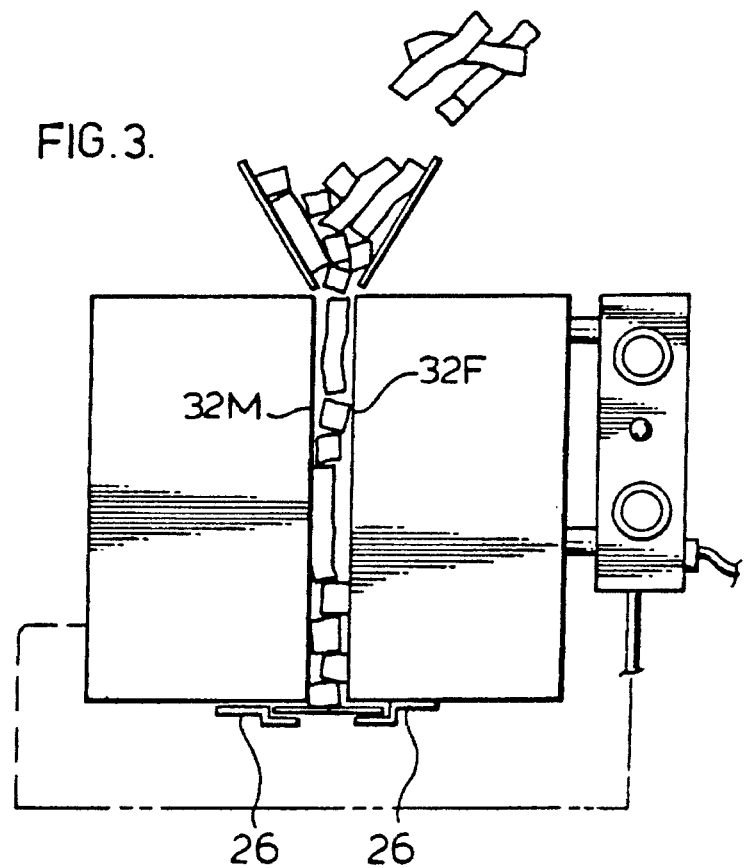
FIG. 3 is a schematic view of demonstrating the filling of the heating space.
Figure 4:
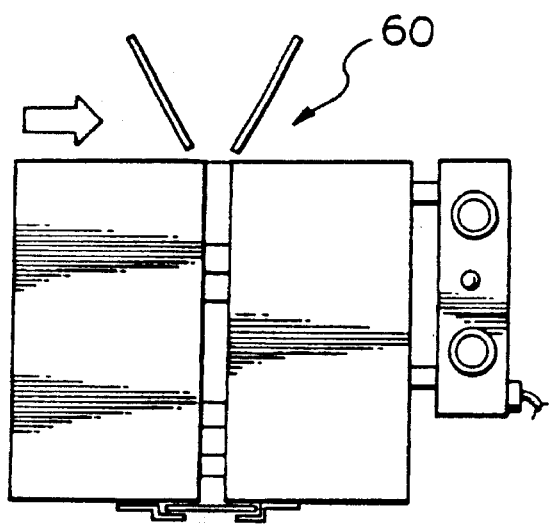
FIG. 4 is a schematic view demonstrating the position of the heating space during heating.
Figure 5:
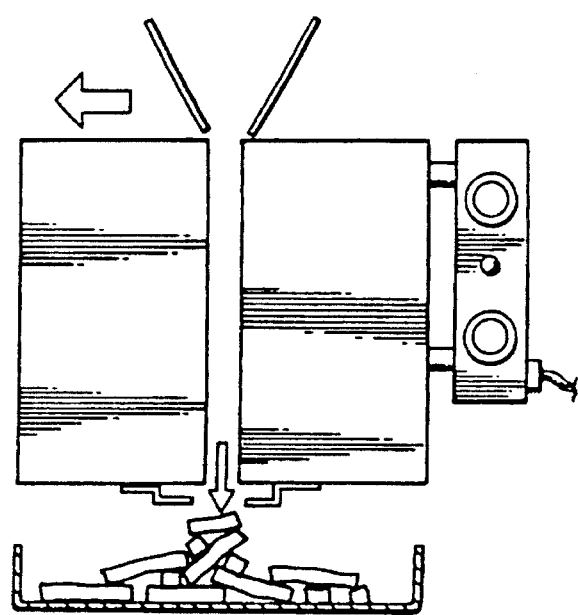
FIG. 5 is a schematic view demonstrating the emptying of the heating space.

'Forward' herein is upward and to the left in FIG. 1 and 'rearward' is the opposite direction.

In drawings, FIG. 1 shows a supporting frame, comprising, four vertical standards 10, the forward and rearward pairs of which are, respectively, joined at the front and back of the device by transverse upper and lower horizontal members 12 and 14 respectively. Upper transverse members 12 are joined at their ends by side members 16 and lower transverse members 14 by side members 18. As shown, the forward and rearward rectilinear assemblies formed by transverse members 12 and 14 and a pair of standards 10, form guides for a chip receiving tray 20 which may be slid forwardly into the frame and withdrawn in a rearward direction.

A pair of horizontal plates 22 are attached to each side member 12 and extend between horizontal members 12, each plate stopping short of the centre of the frame to leave a forward-rearward gap 24 in between. Thus the two plates 22 bordered at the front and rear by transverse members 12 and on the outside by side members 16 form a platform for the remainder of the device to be described.

A pair of members 26 attached to the transverse members 12, on each side of gap 24 form, with members 12, a guideway for a horizontal slide 28 which is adapted to be slid forwardly and rearwardly in the guideway, between a forward closed position where the slide closes gap 24 to the downward passage of food, and a rearward open position where the gap 24 is left open to allow the passage of food downwardly therethrough. The tray 20 and its slideway are dimensioned so that the tray may slide below members 26 forming the slideway.

On one side of the frame, the right in FIG. 1, a fixed heater cabinet 30F is defined by side, bottom, and end walls and is attached to and fixed to the adjacent frame members. The fixed heater cabinet 30 includes an outwardly smooth metal side panel 32F disposed above the right-hand edge 34F of right-hand plate 12 defining gap 24. An electric heating element 37F, indicated schematically, is contained within the heating cabinet and is adapted to heat metal side panel 32F to a sufficient temperature to heat the potato chips or other foodstuffs located adjacent panel 32F. A heater control 36 is located on fixed cabinet 30F and is connected to heat both cabinet 30F and 30M and it will be understood that heating controls, thermostats etc. for controlling and maintaining the temperature of the heater and panel 32F are not described in detail since these are well within the scope of those skilled in the art.

A moveable heating cabinet 30M is located on the opposite side of gap 30. The moveable cabinet 30M is similarly constructed to fixed cabinet 30F except that cabinet 30M is slidable on left hand platform plate 22 toward and away from cabinet 30F. Cabinet 30M is provided with a panel 32M facing panel 32F which is heated by a heating element schematically indicated at 37M connected to control panel 36 by flexible leads 40. Forward and rearward vertical plates 42 are fixed to cabinet 30F and are located to be just forward and rearward of moveable cabinet 30M (Forward Plate 42 is not shown). The plates 42 rigidly support a rectilinear U-shaped frame member which extends leftward from one plate 42, transversely on cross member 44 on the side of cabinet 30M remote from cabinet 3OF, and spaced therefrom and then extends rightward to join the other plate 42. Member 44 is apertured midway along its length and the aperture 46 aligns with a rigidly mounted block 48 having a threaded bore in registration with aperture 46.

A threaded shank 50 extends through the threaded bore to bulbous tip 54, rotatably mounted in a complementary socket 56 mounted on the gap-remote wall of cabinet 30M. Mounted on the outer end of threaded shank 50 is a control arm 52 which is rotatable between a wide position defined by stop 54 and a narrow position defined by stop 56. At the wide position heating panel 32M is vertically disposed above gap edge 34M. This also corresponds to the desired maximum width for the foodstuffs to be received in the heating space located between panels 32F and 32M.

The narrow position defines the narrowest cooking space desired for the range of foodstuffs to be cooked by the device. Thus the heating space is laterally defined by opposed side plates 42 and by panels 32F and 32M. Mounted on plates 42 is a chute 60 defining a downwardly narrowing path for foodstuffs, its lower opening extending over the heating space from front to rear and being dimensioned and located to register with the widest spacing of the heating space.

In operation the elements 37M and 37F for panels 32F and 32M are turned on. The slide 28 is placed in CLOSED position to close the bottom of the heating space. The bar 52 is operated to set the spacing of panels 32M and 32F at a width somewhat greater than the desired spacing for the foodstuffs to be cooked. Thus, is, in its commonest use if potato chips are to be cooked, the spacing of the panels will be 25% to 50% greater than the mean chip diameter. (if a sandwich or patty were to be cooked the panels would be spaced to allow easy slidable insertion of the sandwich or patty).

Continuing the description for potato chips, such chips to be cooked are then dropped into the chute and carried into the space between the panels. Because the spacing of the panels is somewhat less than twice the mean diameter, the chips tend to fill the space between the panels, in a single layer, as measured transversely i.e. horizontally between the panels 32F and 32M. When the space between the panels is loosely filled the crank is moved to bring the panel 32M to the desired spacing from panel 32F so that individual chips tend to be contacted and heated by both panels 32M, 32F on both sides but with minimal crushing of the chips. The heating space is now defined by the opposed panels 32F, 32M, the end plates 42 and the bottom slide 28. Any necessary additives are added to the chips either before or after they enter the heating space. Fumes meanwhile have an easy exit upward from the heating space through the chute. Grease has an easy exit from the heating space through the holes 75 in the slide into a suitable receptacle not shown. All surfaces are vertical excepting the slide 28.

When the cooking process is completed, the basket 20 is placed (if not already in place) between the upper and lower transverse members 12 and 14 and beneath slide 28. The panel 32M is then moved to a wider position from panel 32F and slide 28 is pulled to OPEN position. The chips will then move easily out of the inter-panel space and into the tray 20

(a different receptacle may, if desired, be provided for sandwiches or patties).

Between cooking cycles the smooth vertical panels may easily be cleaned by simply wiping and scraping. There is no place for grease or dirt to collect.

If the panel spacing is narrower than the chute opening during filling, any chips coming to rest on the exposed upper wall of cabinet 30M (below the chute opening) may be easily moved to the interpanel space.

It would be possible within the scope of the invention to design the heating cabinets so that they both moved under a manual control toward and away from each other, but the additional expense of the hardware is not thought to be warranted.

It would be possible within the scope of the invention to use other means for adjustably positioning movable cabinet 30M and other limits (and as stops on the frame or left-hand platform 12) to limit its widening and narrowing movement.

Figure 6:
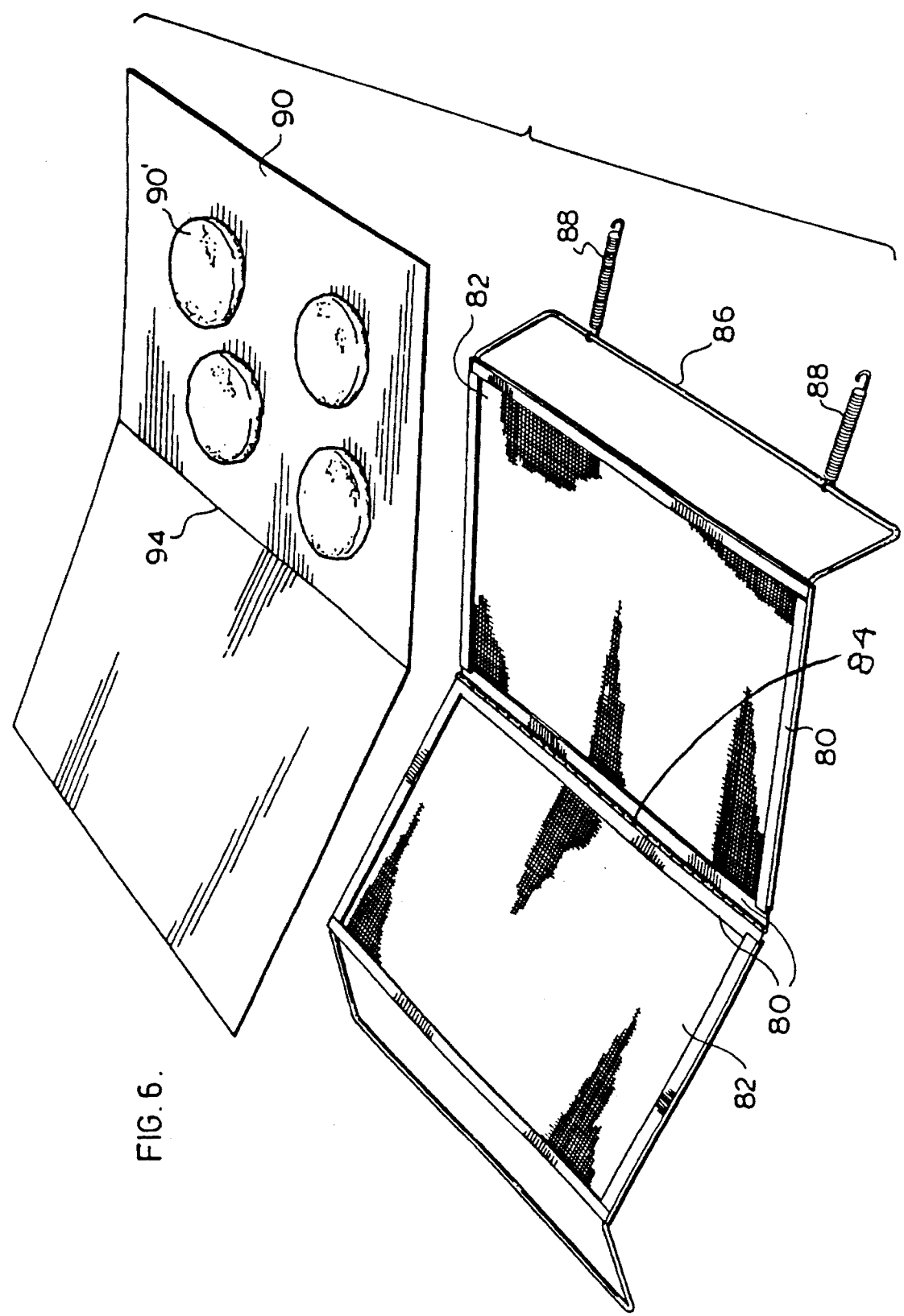
FIG. 6 is an exploded view of an accessory in open position for cooking hamburg patties, with the device shown in FIGS. 1–5.
Figure 8:
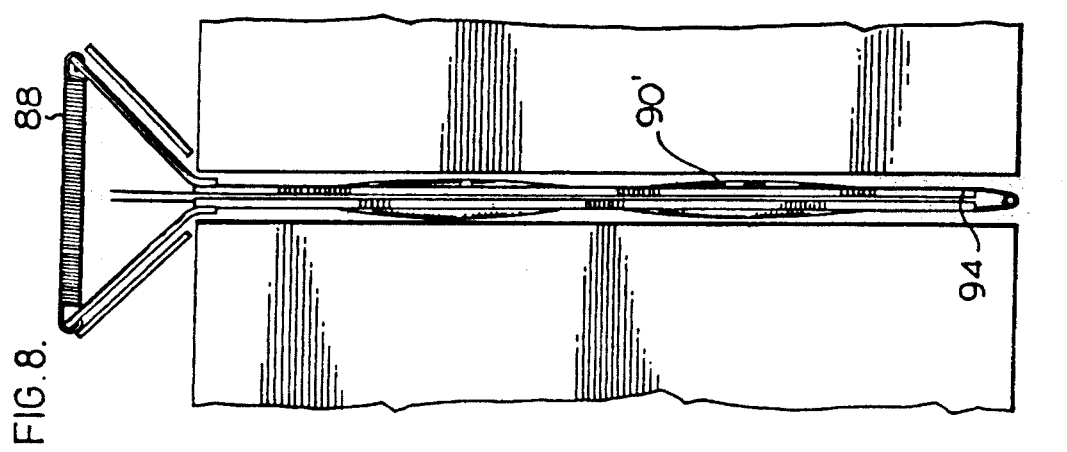
FIG. 7 is a view of the accessory of FIG. 6 in closed position with hamburg patties therein and FIG. 8 is a vertical section of the device of FIGS. 1–5 with the closed device of FIG. 6, therein.
Figure 7:
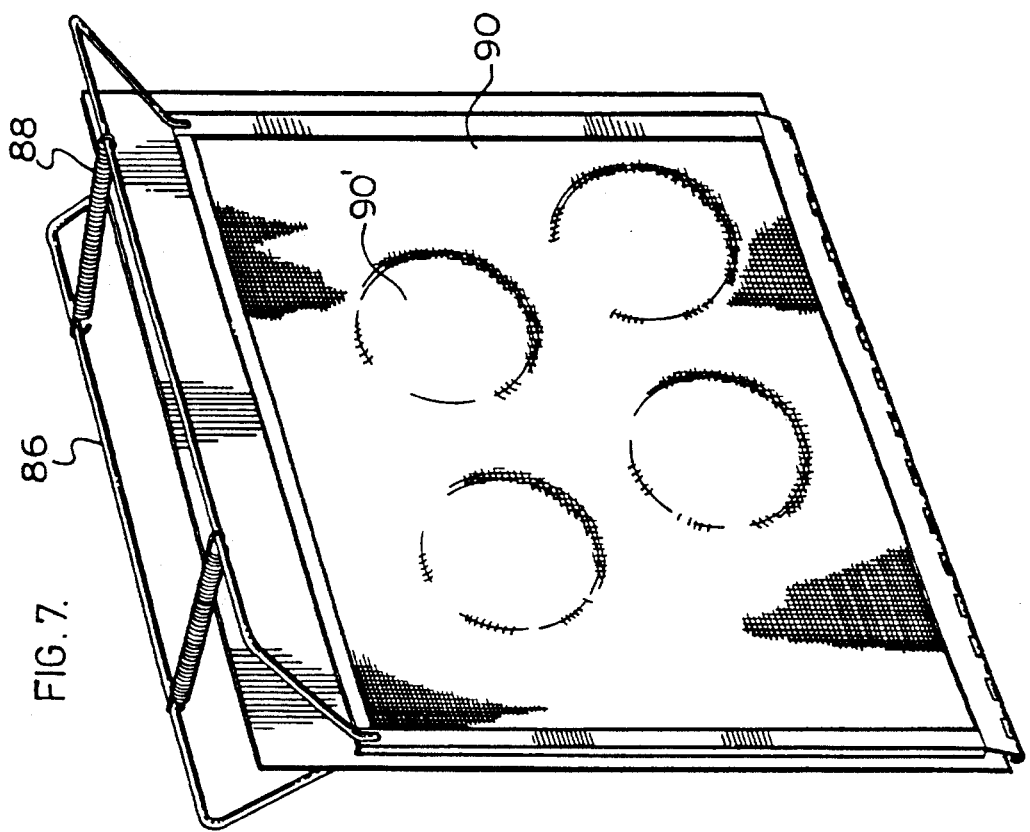

FIGS. 6–8 show a device for cooking hamburg patties with the device of FIGS. 6–8. As will be seen from FIGS. 1–5 a heating space is defined by opposed panels 32 F and 32 M and by opposed plates 42.

FIG. 6 demonstrates hinged screens each comprising stainless steel frames 80 having stainless steel mesh 82 therein. On the side of each frame 80 remote from the hinge 84 is rigidly attached to a framing member providing a bar 86 remote from the frame 80 to which the ends of tension springs 88 may be attached. The bar 86 is displaced from the plane of its adjacent screen 82 so that springs extending between bars 86 will hold the screens in the closed position of FIG. 7. As FIG. 8 demonstrate the framing member for spaced bars 86 may be received in the mouth portion of chute 60, when the screens are in closed position.

As shown in FIG. 6 a foldable piece of non-combustable (preferably silicone) paper 90 may be provided to overlie screens 82 and receive a number (here four) of hamburg patties 90. The screens are then closed and tension springs 88 hooked across bars 86 to hold the screens in closed position, all as shown in FIG. 7. The flexibility of the screens will allow for the thickness of the patties. The closed screens are then inserted in the heating space between panels 32 M and 32 F. The spacing between the panels is adjusted having regard to the thickness of the pattie so that the panels will contact the building screens without damaging the patties. The cooking heat is applied.

Grease from the patties is sealed between the paper folds during the cooking process and does not contaminate the unit or the screens. When the cooking is complete the folded screens may be withdrawn, opened, the patties removed and the paper with such grease discarded.

The process is repeated for a new batch of patties and the screen need not be cleaned for each batch.

Figure 9:
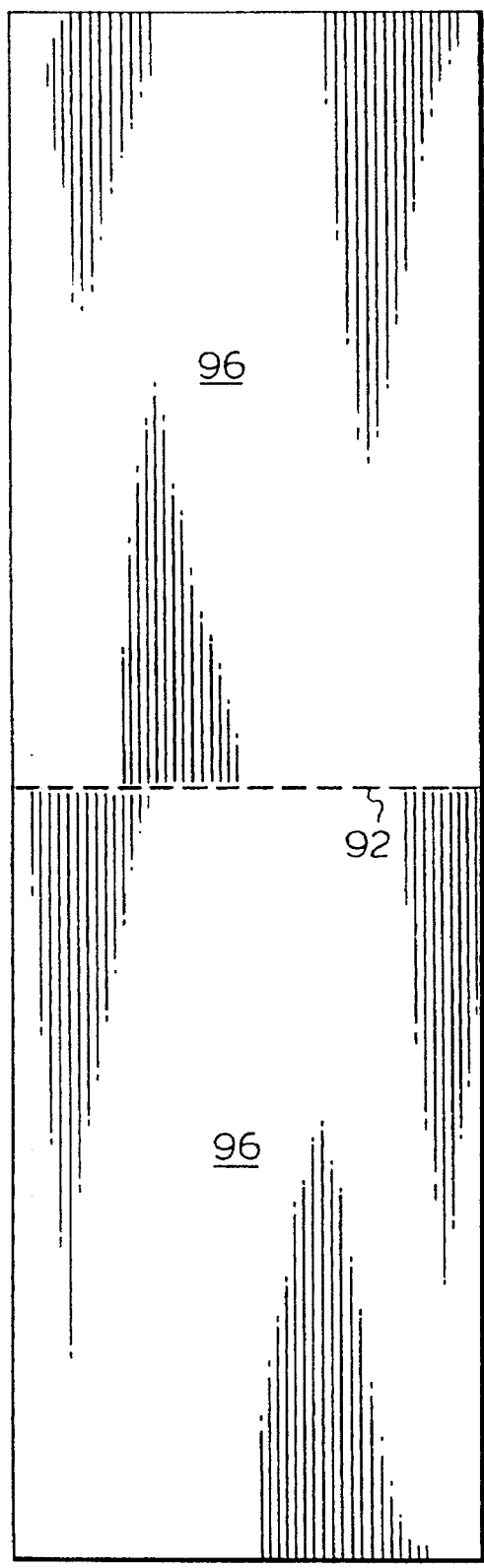
FIG. 9 shows a sheet of silicone coated parchment for making a bag.
Figure 10:
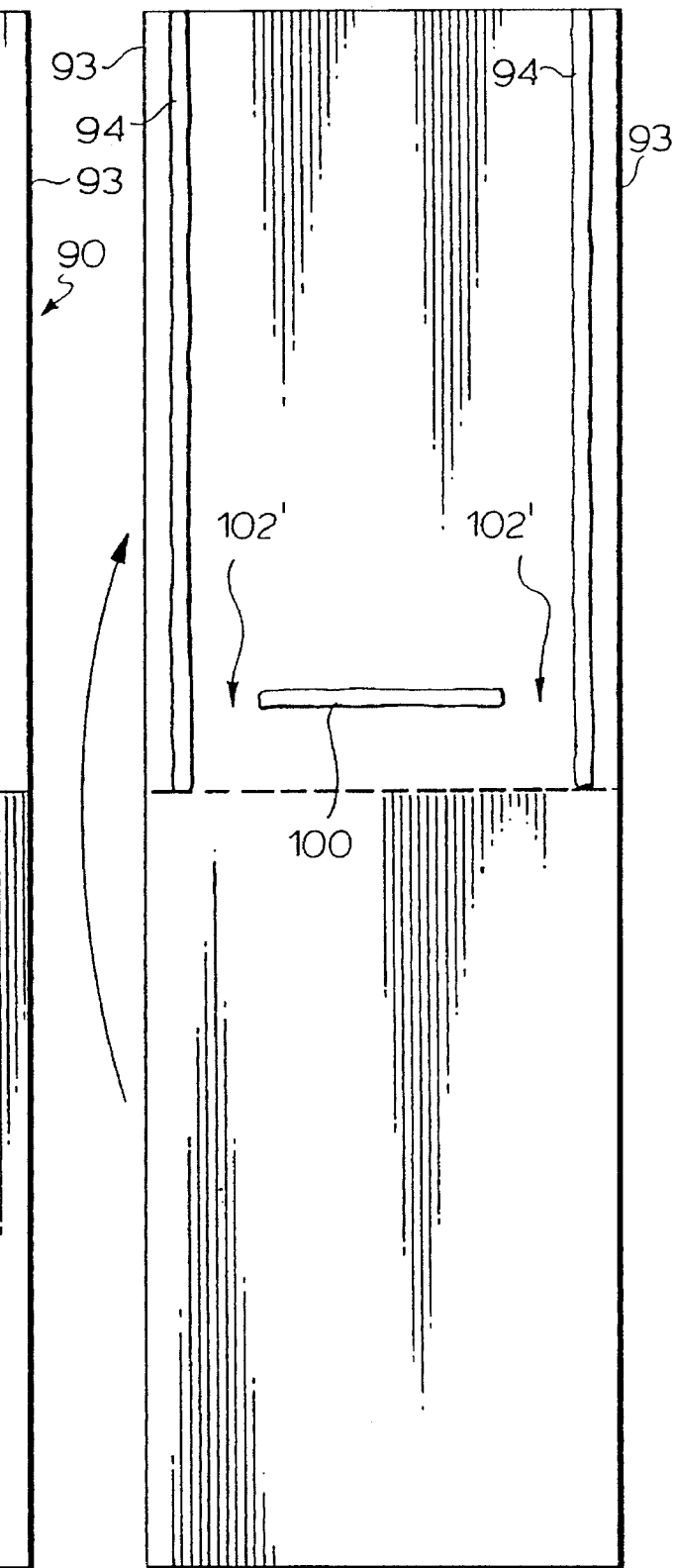
FIG. 10 shows the treatment of the sheet of FIG. 9 to form a bag.

As shown in FIG. 9 and 10 a sheet of silicone paper is to be folded at a fold line 92 to define side walls 96. Accordingly, lines 94 of silicone adhesive are placed adjacent side edges 93 of one of the side walls. A silicone area is arranged in a line 100 spaced a short distance above fold line 92. The paper is then folded about fold line 92 so that the then opposed side walls 96 co-adhere along lines 94 and 100. When the adhesive cures, the bag is ready for use.

The line 100 is of a length so that the spaces 102' between the line 100 and the lines 94 is small enough to prevent hamburg patties reaching line 92 while allowing fat or grease from the patties to run into the space between lines 100 and 92.

The line 100 may of course be interrupted to provide further spaces to allow the downward flow of fat or grease while inhibiting the downward movement of hamburg patties.

The line 100 may be replaced by a glued area or areas of different shape to divide grease and fat from the foodstuffs if something other than hamburg patties is being cooked.

Where the food to be cooked is relatively free of grease (for example a sandwich) the line 100 may be omitted.

Figure 11:
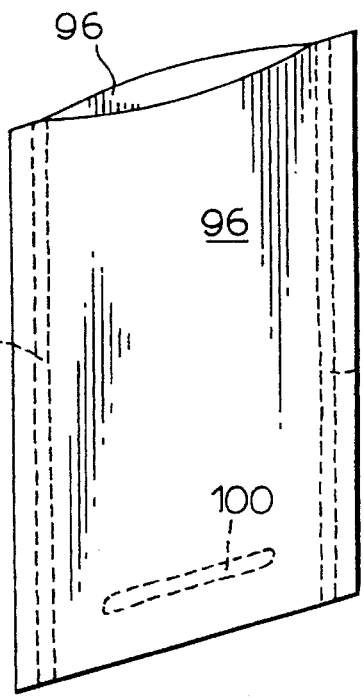
FIG. 11 is a schematic view of a bag in accord with the invention.

FIG. 11 is a schematic view of a completed bag with the location of adhesive lines 100 and 94 shown in dotted form.

Figure 12:
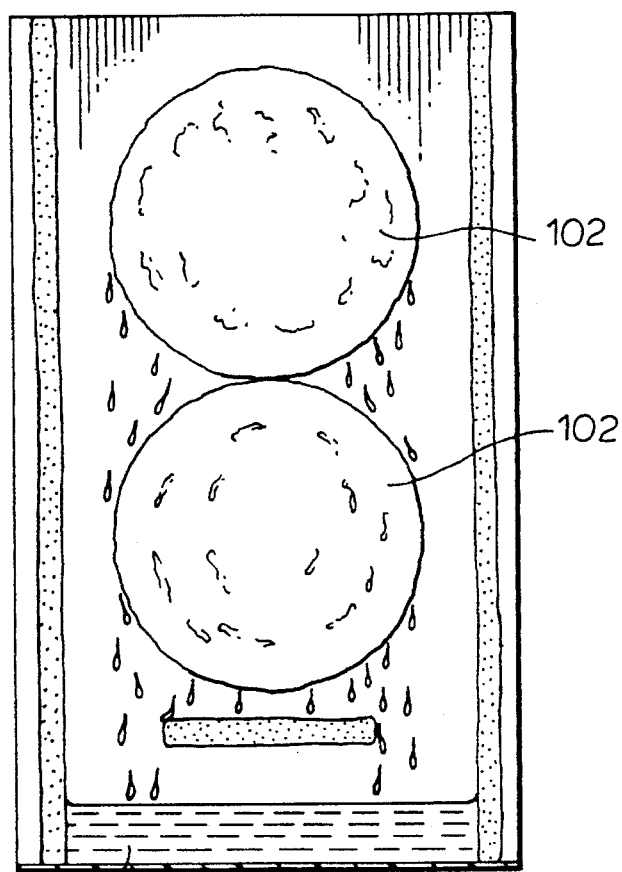
FIG. 12 is a side view of such bag with part of the front side wall removed to show the hamburg patties therein.
Figure 13:
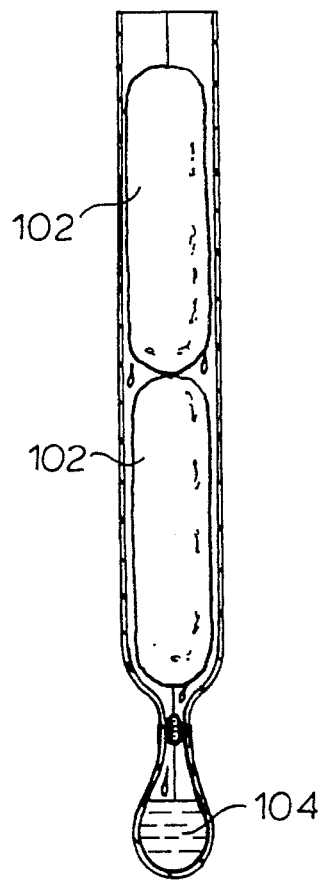
FIG. 13 is a vertical section along the lines of 13—13 of FIG. 12.

FIG. 12 is a schematic side view of a bag with front wall 96 broken away to show the hamburg patties 102 therein.

Figure 14:
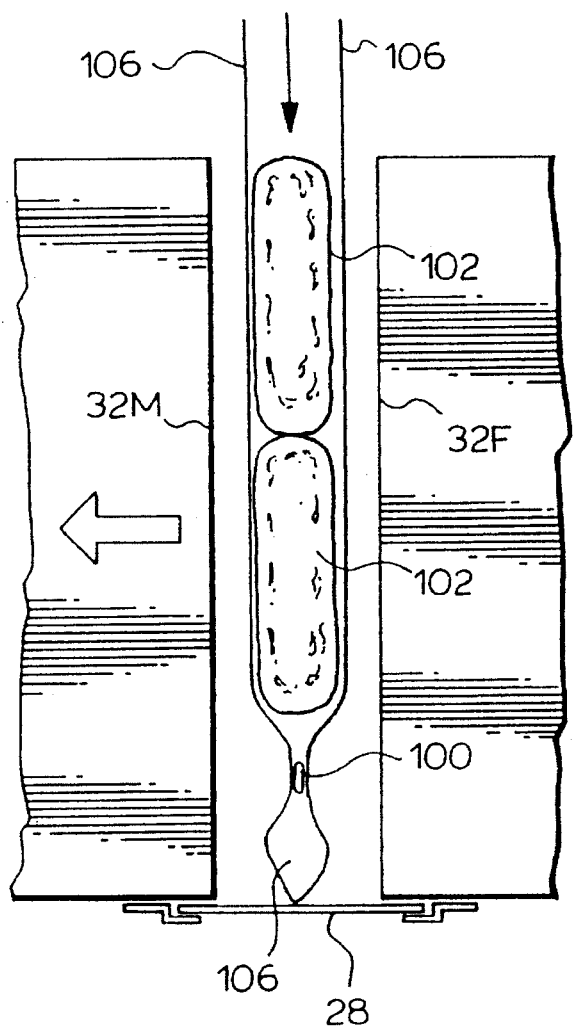
FIG. 14 shows a vertical section of the bag in the heating space before closure of the panels.

FIG. 14 shows the panels 32M and 32F of the device of FIGS. 1–5 spaced to receive the patty-filled bag therebetween. It will be noted that chute 60 has been removed and that slide 28 is in closed position and acts to halt the downward movement of the bag as it is dropped in. It will be noted that, preferably, the bag is dimensioned so that the upper edges 106 of the bag extend above the panels so that they may be grasped to hold the bag while panel 32M is moved to the right to clamp the bag. (If this is not done the bag, on contacting slide 28 may sag and assume an undesirable altitude). In FIGS. 14 it will be noted that, as cooking has not commenced, there is no fat collected in the bag space 106 below line 100.

Figure 15:
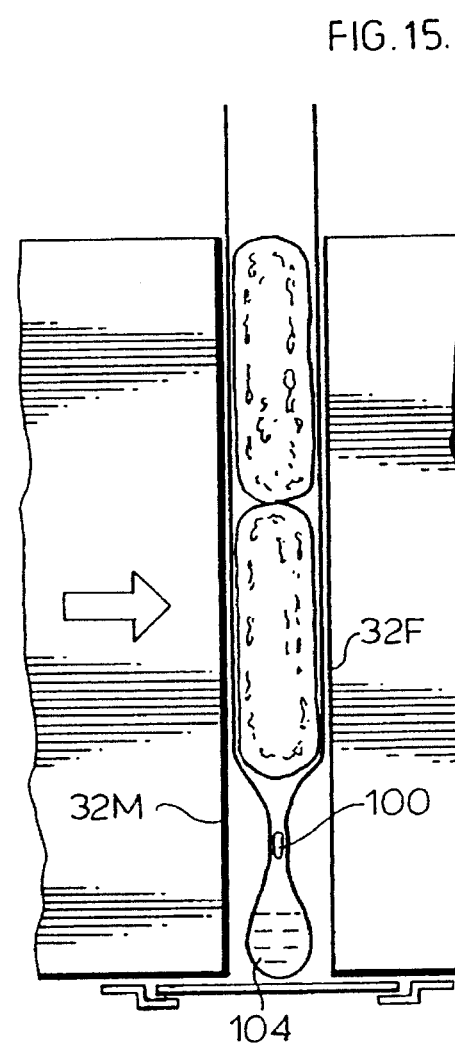
FIG. 15 shows such vertical section after closure of the panels.

In operation the bag is manually held (not shown) when lowered between the panels 32M, 32F spaced as in FIG. 14. The bag is thus manually suspended with the patties between the panels until the bag and its contents are lightly clamped (FIG. 15) by movement of panel 32M to the right, as previously described. The panels are heated to cause cooking of the patties. The fat and grease 104 travel downwardly past the area 100 as best shown in FIG. 12 while the patty remains above. When cooking is completed, the panels are separated and the bag with the patties is lifted upwardly out of the heating space and the patties removed. The grease is poured out of the bag. The bag may be used another 6 or 7 times before it deteriorates if desired.

I prefer to obtain non-combustible silicone paper from Norscan Paper Products Limited, 2 Vata Court, Unit 1, Aurora, Ontario, Canada. The silicone adhesive may be obtained from General Electric Silicones Canada, 2300 Meadowvale Boulevard, Mississauga, Ontario Canada. The silicone parchment and silicone adhesive are FDA, USDA, and NSF (National Sanitation Federation) approved.

I claim:

1. Vertical double contact griddle comprising:

a first generally vertical heating panel and means for heating said first panel, a second generally vertical heating panel facing said panel and means for heating said second panel, facing surfaces on said first and second panels which are respectively generally smooth, said facing surfaces defining a heating space between them, means for adjusting the relative spacing of said heating panels, opposed end walls connected to said panels while allowing said adjusting each facing said space and located to define the ends of said heating space, a hinged screens located between said panels adapted to receive hamburg patties between them and, when closed on said patties, to be received in said heating space.

2. Vertical double contact griddle comprising:

a first generally vertical heating panel and means for heating said first panel, a second generally vertical heating panel facing said first panel and means for heating said second panel, facing surfaces on said first and second panels which are respectively generally smooth, said facing surfaces defining a heating space between them, means for adjusting the relative spacing of said heating panels, opposed end walls each facing said space and connected to said panels while allowing said adjusting and defining ends for said heating space, a sliding bottom panel mounted to move relative to said panels between a CLOSED and an OPEN position, in said CLOSED position defining a bottom for said heating space, and a pair of screens located between said panels, joined by a hinge movable between open and closed position, designed to be lined with non-combustable paper creased adjacent the hinge, designed to receive hamburg patties on said paper, said screens being dimensioned and shaped with hamburg patties between said screens to be received in said heating space.

3. Vertical double contact griddle comprising:

a first generally vertical heating panel and means for heating said first panel, a second generally vertical heating panel facing said first panel and means for heating said second panel, facing surfaces on said first and second panels which are respectively generally smooth, said facing surfaces defining a heating space between them, means for adjusting the relative spacing of said heating panels, opposed end walls each facing said space and connected to said panels while allowing said adjusting and defining ends for said heating space, a sliding bottom panel mounted to move relative to said panels between a CLOSED and an OPEN position, in said CLOSED position defining a bottom for said heating space, in combination with:

an upwardly open cooking bag having opposed side walls, joined at their side edges and at the bottom said cooking bag comprising a parchment sheet coated on each side with silicone folded to provide a fold line to define the bottom edge and the side walls, with the side walls sealed with silicone adhesive along adjacent edges to form said side edges, said side walls joined at least one area of silicone adhesive a short distance above said fold line, said area being adapted to inhibit foodstuffs thereabove passing there below but adapted to allow liquid from said foodstuffs to flow downwardly therearound, said bag being dimensioned to receive foodstuffs therein, above said area and, with such foodstuffs therein to define a horizontal section dimensioned to be received in said heating space.

4. Means of heating foodstuffs comprising:

a pair of opposed vertical panels, means for adjustably varying the spacing between said panels, means for providing a heating space bounded horizontally by said panels by end walls and a removable bottom wall, means exterior to said space for heating each of said panels, in combination with:

an upwardly open cooking bag having opposed side walls, joined at their side edges and at the bottom, said bag comprising a parchment sheet coated on each side with silicone, folded to provide a fold line to define the bottom edge and the side walls, with the side walls sealed with silicone adhesive along adjacent edges to form said side edges, said side walls joined by at least one area of silicone adhesive a short distance above said folded line, said area being adapted to prevent foodstuffs thereabove passing therebelow but adapted to allow liquid from said foodstuffs to flow therearound, said bag being dimensioned to receive foodstuffs therein, above said area and with such foodstuffs therein, to define a horizontal section dimensioned to be received in said heating space.

5. Vertical double contact griddle as claimed in claim 4 wherein said sheet is generally rectilinear in outline and said fold line is substantially parallel to one of said edges.

6. Means for heating foodstuffs as claimed in claim 4 wherein said sheet is generally rectilinear in outline and said fold line is substantially parallel to one of said edges.

7. Vertical double contact griddle as claimed in claim 4 wherein said bag is dimensioned so that, with said fold line contacting said bottom panel, at least one of said side walls extends above said heating space.

8. Means for heating foodstuffs as claimed in claim 4 wherein said bag is dimensioned so that, with said fold line contacting said bottom panel, at least one of said side walls extends above said heating space.

9. Vertical double contact griddle comprising:

a first generally vertical heating panel and means for heating said first panel, a second generally vertical heating panel facing said first panel and means for heating said second panel, facing surfaces on said first and second panels which are respectively generally smooth, said facing surfaces defining a heating space between them, means for adjusting the relative spacing of said heating panels, opposed end walls each facing said space and connected to said panels while allowing said adjusting and defining ends for said heating space, a sliding bottom panel mounted to move relative to said panels between a CLOSED and an OPEN position, in said CLOSED position defining a bottom for said heating space, in combination with:

an upwardly open cooking bag having opposed side walls, joined at their side edges and at the bottom, said cocking bag comprising a parchment sheet coated on each side with silicone and folded to provide a fold-line to define the bottom edge and the side walls of the bag, with opposed side walls sealed to each other with silicone adhesive along adjacent edges to form said side edges, said bag being dimensioned to receive foodstuffs therein, with said foodstuffs therein to be received in said cooking area.

10. An upwardly open cooking bag having opposed side walls joined at their side edges and at the bottom, said bag comprising a parchment sheet coated on each side with silicone, folded to provide a bottom edge, and the side walls, with the side walls sealed to each other with silicone adhesive along mutually adjacent edges.

11. A cooking bag as claimed in claim 10 wherein said side walls are joined by at least one area of silicone adhesive, said area being adapted to inhibit foodstuffs passing therebelow but adapted to allow liquid from said foodstuffs to flow downwardly therearound, said bag being dimensioned to receive foodstuffs therein, above said area.

12. Upwardly open cooking bag as claimed in claim 10 wherein said sheet is generally rectangular in outline and said fold-line is substantially parallel to one of said edges.

* * * * *